(12) United States Patent
Lutz et al.

(10) Patent No.: US 6,725,136 B2
(45) Date of Patent: Apr. 20, 2004

(54) TIRE PRESSURE AND PARAMETER MONITORING SYSTEM AND METHOD USING ACCELEROMETERS

(75) Inventors: Markus Lutz, Sunnyvale, CA (US); Jean-Pierre Hathout, Mountain View, CA (US); Aleksandar Kojic, Cupertino, CA (US); Aaron Partridge, Palo Alto, CA (US); Jasim Ahmed, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/114,757

(22) Filed: Apr. 1, 2002

(65) Prior Publication Data
US 2003/0187555 A1 Oct. 2, 2003

(51) Int. Cl.$^7$ .................................................. G06F 7/00
(52) U.S. Cl. ............................................ 701/29; 701/34
(58) Field of Search ..................... 701/29, 34; 301/5.1, 301/5.24; 340/442, 425.5, 444, 445, 449

(56) References Cited

U.S. PATENT DOCUMENTS

| 5,591,906 A | | 1/1997 | Okawa et al. | |
|---|---|---|---|---|
| 5,721,528 A | * | 2/1998 | Boesch et al. | ............... 340/442 |
| 6,313,742 B1 | * | 11/2001 | Larson | ....................... 340/442 |

FOREIGN PATENT DOCUMENTS

| EP | 0 489 562 | 6/1994 |
|---|---|---|
| EP | 0 657 313 | 6/1995 |
| EP | 0 554 131 | 10/1996 |
| EP | 0 925 960 | 6/1999 |

\* cited by examiner

*Primary Examiner*—Yonel Beaulieu
(74) *Attorney, Agent, or Firm*—Kenyon & Kenyon

(57) ABSTRACT

Method for monitoring an operating condition of a vehicle including determining a longitudinal, a lateral, and/or a vertical acceleration, as well as a wheel rotation speed. Determining from the wheel rotation speed and the longitudinal, the lateral, and/or the vertical acceleration a tire condition, a wheel condition, and/or a suspension condition. Device including an accelerometer at a wheel of a vehicle, a wheel rotation speed sensor, and a microprocessor for determining an operating condition. The accelerometer determining a longitudinal, a lateral, and/or a vertical acceleration. The wheel rotation speed sensor determining a rotation speed of the wheel. The microprocessor electrically coupled to the accelerometer and the wheel rotation speed sensor. System for monitoring an operating condition of a vehicle including an accelerometer for each wheel of the vehicle at an axle-end. Each accelerometer determining a longitudinal, a lateral, and/or a vertical acceleration. Wheel rotation speed sensor for each wheel of the vehicle arranged at an axle-end and determining a rotation speed for each wheel. Microprocessor determining the operating condition including a tire condition, a wheel condition, and/or a suspension condition. The microprocessor electrically coupled to each accelerometer and each wheel rotation speed sensor.

42 Claims, 3 Drawing Sheets

TIRE PRESSURE AND PARAMETER MONITORING SYSTEM AND METHOD USING ACCELEROMETERS

FIELD OF THE INVENTION

The present invention generally regards monitoring vehicle data collected from an accelerometer. More particularly, the present invention regards a method and system for monitoring tire pressure and tire parameters using an accelerometer mounted near a wheel.

BACKGROUND INFORMATION

Significant effects on the tire/wheel/suspension ensemble and overall driving safety may be caused by any of tire deflation or underinflation; tire tread wear, separation, or aging; suspension aging and failure; external ambient conditions (e.g., temperature, humidity); and wheel imbalance. Several systems have been developed to monitor tire pressure in particular, including both direct and indirect systems.

Direct measurement systems include pressure sensors and temperature sensors mounted in the tire in which the signals are wirelessly transmitted to a control unit. The disadvantages of such a system are that it may require batteries, which can cause failure when the batteries fully discharge, problems at low temperatures, and disposal problems. There may be communication problems arising in such a system due to the difficulty of distinguishing the signals received from different tires due to the wireless connections. Additionally, ESD (electrostatic dischage) problems may develop in such a system.

Indirect systems available include algorithms using ABS sensor signals such as wheel speed and inertial sensors. Various problems may be associated with these indirect measurement systems. For instance, some driving conditions may not produce significant information. Also, accuracy may potentially be reduced during new tire brake-in or after a tire change. Additional sensor signals from active dampers (e.g., vertical displacement sensors) may be used in indirect monitoring systems to increase accuracy, and may utilize dynamic frequency evaluation of wheel speed sensors using Fast Fourier Transforms (FFTs). However, there may be insufficient excitation on smooth roads to yield good data utilizing this method. Additionally, there is still significant imprecision with this method and potentially anomalous readings may yield insufficient information to form a conclusion.

Therefore, what is needed is a method for measuring tire pressure, tire tread condition, suspension condition, and other vehicle dynamics using sensors already on many vehicles (including wheel rotation speed sensors), systems already present in some vehicles (electronic stability programs (ESP) and anti-lock braking systems (ABS)), and low-cost additional sensors that increase accuracy by measuring missing dynamics.

SUMMARY OF THE INVENTION

A method is provided for monitoring an operating condition of a vehicle including the steps of measuring a longitudinal, a lateral, and/or a vertical acceleration, as well as a wheel rotation speed. The method involves determining a tire condition, a wheel condition, and/or a suspension condition from the wheel rotation speed and the longitudinal, the lateral, and/or the vertical acceleration. Two methods of data analysis are provided which may be utilized alone or in combination. The methods are on-line model-based observers (on-line estimators) and data-based signal processing using power spectral methodologies (one possible method is monitoring Fast Fourier Transforms (FFTs) envelopes).

A device is provided including an accelerometer at a wheel of a vehicle, a wheel rotation speed sensor, and a microprocessor for determining an operating condition. The accelerometer measures a longitudinal, a lateral, and/or a vertical acceleration. The wheel rotation speed sensor measures a rotation speed of the wheel. The microprocessor is electrically coupled to the accelerometer and the wheel rotation speed sensor.

A system is provided for monitoring an operating condition of a vehicle which includes an accelerometer (one-dimensional, two-dimensional, or three-dimensional) for each wheel of the vehicle at an axle-end. Each of the accelerometers measures a longitudinal, a lateral, and/or a vertical acceleration. A wheel rotation speed sensor for each wheel of the vehicle is arranged at an axle-end and measures a rotation speed for each wheel. A microprocessor determines the operating condition, which may include a tire condition, a wheel condition, and/or a suspension condition. The microprocessor is electrically coupled to each of the accelerometers and each of the wheel rotation speed sensors.

The advantages of the present invention are that there may be sufficient excitation of the sensor systems from a normal tire tread and proper inflation on even a smooth road. No wireless connection may be necessary, and therefore there may be fewer communication problems and therefore better data and increased accuracy. The accelerometer(s) may be integrated with the wheel rotation speed sensors already used for ABS. The signals may be transmitted over the same output as the wheel rotation speed sensor by modulating the signal or by any other appropriate method of simultaneous signal transmission. This may avoid additional mounting and wiring and the costs associated therewith.

DETAILED DESCRIPTION

Figure 1:
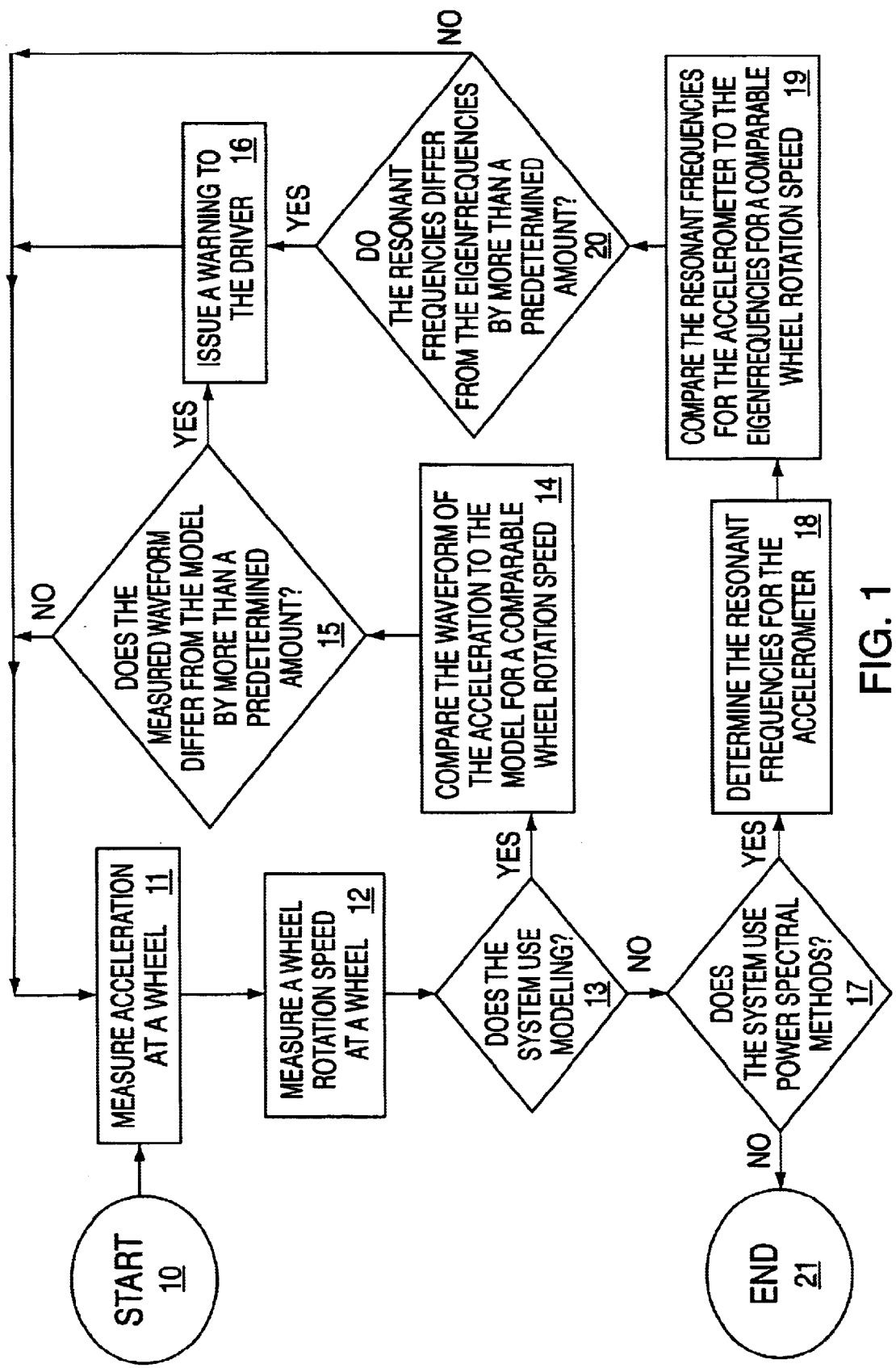
FIG. 1 is a flowchart illustrating the method for determining a tire pressure or another tire parameter using an accelerometer mounted near a wheel of a vehicle.

The present invention addresses the problem of identifying changing vehicle tire/wheel/suspension parameters due to pressure loss, temperature, and aging. In addition, wheel imbalance and tread separation may be detected by the method and system of the present invention. The method utilizes either or both of two methodologies. The first methodology is model-based and the second methodology is data-based.

Using the first methodology, the method according to the present invention may involve comparing a mathematical model of the suspension system and/or vehicle dynamics to identify an error. This error might be indicative of tire deflation or tire tread separation problems.

Using the second methodology, the present invention provides direct measurement of the wheel resonant frequencies and damping coefficient using a low-cost accelerometer mounted on the suspension. Power spectral methods (e.g. monitoring FFTs envelopes) may be used to identify the eigenfrequencies or resonant frequencies of the systems. Tire tread wear may be detected by a change in the tread characteristic frequency.

One-dimensional, two-dimensional, or three-dimensional accelerometers (e.g., operating in a longitudinal, lateral, and vertical direction) may be used. The accelerometer may be mounted on the axle near the wheel, and may be in the vicinity of the wheel rotation speed sensor. The accelerometer may be a small, low-cost accelerometer including a MEMS (microelectromechanical system) accelerometer that operates as a mass-spring and which may be easily mass produced.

The present invention may be economically implemented by using the electronic control unit (ECU) already present in many vehicles for operating an ABS and/or ESP system. No additional wires may be necessary. The system according to the present invention may also be advantageously used to measure wheel imbalance at the wheel by monitoring a frequency induced by imbalance. Additional information which may be useful for other systems (e.g., ESP, ABS, etc.) such as road condition, shock absorber coefficient, different tire modes (longitudinal, lateral, and vertical) may be estimated by the method according to the present invention, especially in combination with the vehicle model. These parameters may significantly improve control of the vehicle.

The system according to the present invention provides for a wheel rotation speed sensor at each wheel on the end of the axle. Some vehicle systems already utilize wheel rotation speed sensors including ESP and ABS systems. The output from these sensors already present in the vehicle may be utilized in the method according to the present invention, thereby reducing the need for additional equipment to implement the method. Additionally, an accelerometer may be incorporated in the wheel rotation speed sensor and may use the same signal connection to the ECU, thereby further reducing the cost of implementing the system. The signals of the accelerometer and the wheel rotation speed sensor may be communicated on the same signal connection by any of several methods of concurrent communication, including modulation of the signals.

FIG. 1 shows a flowchart illustrating the method according to the present invention. The flow starts in Circle 10 and proceeds to Box 11 where an acceleration is measured at a wheel. The accelerometer employed in the method may measure acceleration in any of the longitudinal, lateral, and/or vertical directions, and may be a one-dimensional, two-dimensional, or three-dimensional accelerometer. Additionally, the method according to the present invention may be implemented on any or all wheels of a vehicle having any number of wheels. The flow then proceeds to Box 12, where the wheel rotation speed is measured. The accelerometer employed in the method step of Box 11 may be integrated with the wheel rotation speed sensor employed in the method step of Box 12, or the two sensors may be separately mounted. From Box 12, the flow proceeds to Diamond 13, which asks whether the system uses modeling. If the response to the question posed by Diamond 13 is in the affirmative, the flow proceeds to Box 14. In Box 14, the waveform of the measured acceleration is compared to the modeled waveform for a comparable wheel rotation speed.

The model-based observers method uses the measurements of an accelerometer, wheel rotation speed sensor, and any other appropriate sensor for the same model vehicle with good tires at the proper pressure (i.e., nominal conditions). The nominal behavior displayed by the model provides a benchmark for comparison of the data collected by the system. If a deviation from the benchmark, either time-averaged, momentary, or by any other predetermined method, is sensed, then a warning may be provided to the user/driver in the form of a warning light or a warning sound. The system may be able to determine the cause of the deviation (e.g., tire deflation, tread wear, suspension, etc.) and may therefore be able to provide a warning signal which is unique to the type of problem identified. Additionally, the deviation may be noted and used as an input in the ABS and/or the ESP system to improve driving performance and/or safety.

After the comparison in Box 14, the flow proceeds to Diamond 15, which asks whether the measured waveform differs from the model by more than a predetermined amount. The predetermined amount may depend on several factors, including the type of vehicle, the accuracy of the sensors, the model, and the purpose of the measurement (e.g., whether the warning that would issue for deviation, for instance in Box 16, is a high-level warning indicating immediate danger or is instead a low-level warning indicating that investigation or caution is necessary or advisable).

If the response to Diamond 15 is affirmative, then the flow proceeds to Box 16 in which a warning is issued to the driver. The warning issued in Box 16 may be audible or visual, and may be scaled to indicate the amount of deviation detected in the comparison conducted in Box 14. A scaled audible signal might differ in tone and/or volume as the deviation increases, and a scaled visual signal may change in color and/or intensity, or may be configured as a bar graph indicating the amount of deviation detected. Additionally, a combination of audible and visual warning signals may be utilized. The warning issued in Box 16 may be either a momentary warning, or may be a continuous warning that would continue to be emitted until a comparison is run in which the measured acceleration does not deviate more than a predetermined amount from the model. Additionally, a manual shut-off for the warning signal may be provided. After the warning issues in Box 16, the flow proceeds back to Box 11, where the measuring and analyzing process begins again. If the answer to the question posed in Diamond 15 is negative, then the flow proceeds back to Box 11. In an alternative method in which both model-based observers and power spectral methods (e.g. monitoring FFTs envelopes) are utilized, the flow might proceed to Diamond 17 from a negative response in Diamond 15.

If the response to the question posed by Diamond 13 is in the negative, the flow proceeds to Diamond 17, which asks whether the system uses power spectral methods. If the response to the query posed in Diamond 17 is affirmative, the flow proceeds to Box 18, which determines the resonant frequencies for the accelerometer. This determination may yield several resonant frequencies, with each resonant frequency corresponding to a different system. The lowest resonant frequency may correspond to the vehicle body. A middle resonant frequency may correspond to the vehicle suspension system and may also include information relating to the wheel balance and/or the wheel rim condition. A highest frequency resonant frequency may correspond to the vehicle tire system, and may include information relating to tire pressure and tire tread wear. From Box 18, the flow proceeds to Box 19 which compares the resonant frequencies for the accelerometer to the resonant frequencies for a comparable wheel rotation speed.

Power spectral methods (e.g. monitoring FFTs envelopes) may be utilized to identify a deflation, underinflation, tread wear, tread failure, and/or imbalance situation. A power spectral method analysis would determine the resonant frequencies (eigenfrequencies) of the signals obtained from the accelerometer. The measured resonant frequencies may be compared to a benchmark (nominal) resonant frequencies stored in a memory device which may be included in the ECU. If a deviation from any benchmark or nominal resonant frequencies of an amount greater than a predetermined deviation limit is identified, then a warning (visual or audible) and/or an adjustment of the driving dynamics (in the ABS, ESP, active damper, or any other appropriate system) may be initiated. The resonant frequencies may correspond to different vehicle systems. The vehicle body may represent the lowest resonant frequency, the suspension system and rims may represent a medium resonant frequency, and the tires (including tire pressure and tread condition) may represent a high resonant frequency.

The flow proceeds from Box 19 to Diamond 20, which asks whether the resonant frequencies differ from the resonant frequencies by more than a predetermined amount. As indicated with respect to Diamond 15, the predetermined amount of Diamond 20 may depend on several factors, including the type of vehicle, the accuracy of the sensors, the model, and the purpose of the measurement. If the answer to the query posed by Diamond 20 is in the affirmative, the flow proceeds to Box 16, which has been described above. From Box 16, as indicated above, the flow proceeds back to Box 11 to start the process over again. If the answer to the query posed by Diamond 20 is in the negative, the flow proceeds directly to Box 11 to start the process over again.

If the response to the query posed in Diamond 17 is negative, the flow proceeds to Circle 21, which is the end of the method.

Figure 2:
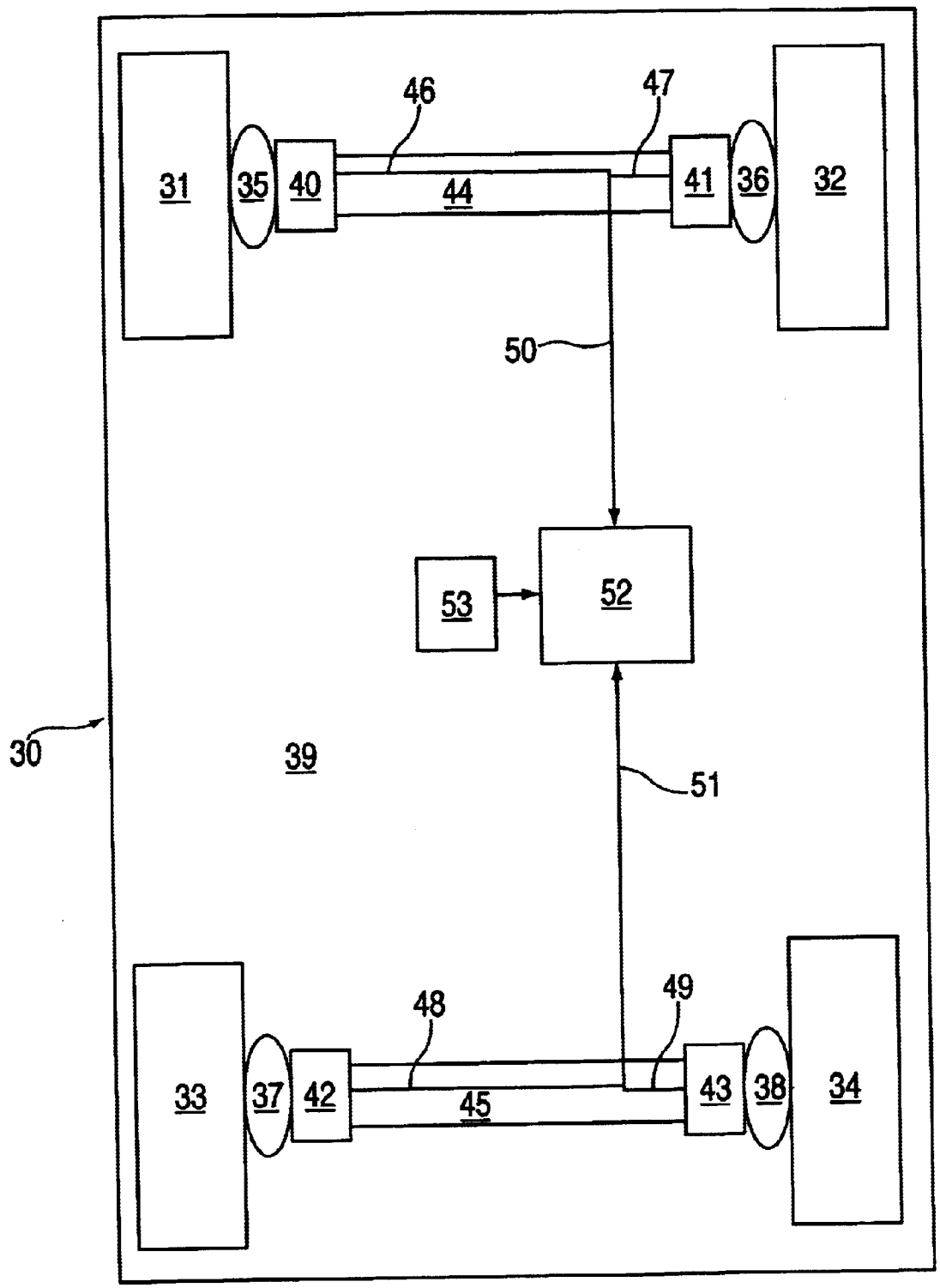
FIG. 2 illustrates diagrammatically a system using accelerometers mounted near each wheel of a vehicle for use in modeling tire pressure and tire parameters.

FIG. 2 illustrates diagrammatically a system according to the present invention. FIG. 2 shows Vehicle 30 having Tires 31, 32, 33, and 34. Tires 31 and 32 are each mounted on a wheel (not shown) which are each attached to an end of Axle 44 via Suspension Unit 35 and 36, respectively. Likewise, Tires 33, and 34 are each mounted on a wheel (not shown) which are each attached to an end of Axle 45 via Suspension Unit 37 and 38, respectively. Suspension Units 35, 36, 37, and 38 may or may not include active damping units and/or vertical displacement sensors. Active damping units have been used in vehicles to adjust vehicle suspension systems in response to manual inputs from the driver and/or electronic inputs from a microprocessor. Vertical displacement sensors have been used on shocks or other suspension units to measure the amount of movement of a shock or other suspension unit. The data obtained from a vertical displacement sensor may be used as an input to any type of vehicle system, including an ESP or an ABS. Sensor Unit 40 is attached to an end of Axle 44 close to Tire 31. Similarly, Sensor Unit 41 is attached to an end of Axle 44 close to Tire 32, Sensor Unit 42 is attached to an end of Axle 45 close to Tire 33, and Sensor Unit 43 is attached to an end of Axle 45 close to Tire 34.

Sensor Units 40, 41, 42, and 43 include an accelerometer, which may be a one-dimensional, two-dimensional, or three-dimensional accelerometers capable of measuring acceleration in a longitudinal, lateral, and/or vertical direction. The accelerometer may be a micro-electromechanical (MEMS) device utilizing a mass and spring configuration. Alternatively, any other type of accelerometer for any number of dimensions and in any desired orientation may be utilized in Sensor Units 40, 41, 42, and 43. Sensor Units 40, 41, 42, and 43 may also include a wheel rotation speed sensor which measures the number of rotations per unit time of Tires 31, 32, 33, and 34, respectively. In alternative embodiments, the wheel rotation speed sensors are part of a separate sensor unit (not shown). In both the illustrated and alternative embodiments, the wheel rotation speed sensors may provide data to other vehicle systems, for example an Electronic Stability Program (ESP) and/or an Anti-Lock Brake System (ABS).

Sensor Units 40, 41, 42, and 43 are electrically coupled to Electronic Control Unit 52 via Wires 46, 47, 48, and 49, respectively. Sensor Units 40, 41, 42, and 43 may use a dedicated coupling to Electronic Control Unit 52 or may use a wire already present as part of another electrical system. Alternatively, Sensor Units 40, 41, 42, and 43 may communicate with Electronic Control Unit 52 via an optical connection, a wireless connection, or any other appropriate means for communicating information. Additionally, Wires 46 and 47 from Sensor Units 40 and 41 may run to a central point on Axle 44 and merge into Network Wire 50. Similarly, wires 48 and 49 from Sensor Units 42 and 43 may run to a central point on Axle 45 and merge into Network Wire 51. Network Wires 50 and 51 may run from their respective axles to Electronic Control Unit 52, which may be arranged in a central position in the vehicle. In a central position within Vehicle 30, and possibly at the center of gravity of Vehicle 30, Inertial Sensor 53 may be positioned. Inertial Sensor 53 may be used as an. additional input to Electronic Control Unit 52.

Electronic Control Unit 52 may operate an Electronic Stability Program (ESP) and/or an Anti-Lock Brake System (ABS). Additionally, Electronic Control Unit 52 may use the sensor signals from Sensor Units 40, 41, 42, and 43 to determine if there is a tire deflation problem, a worn-tread problem, a wheel-imbalance problem, a wheel-rim problem, a suspension problem, and/or a problem with the vehicle body.

Figure 3:
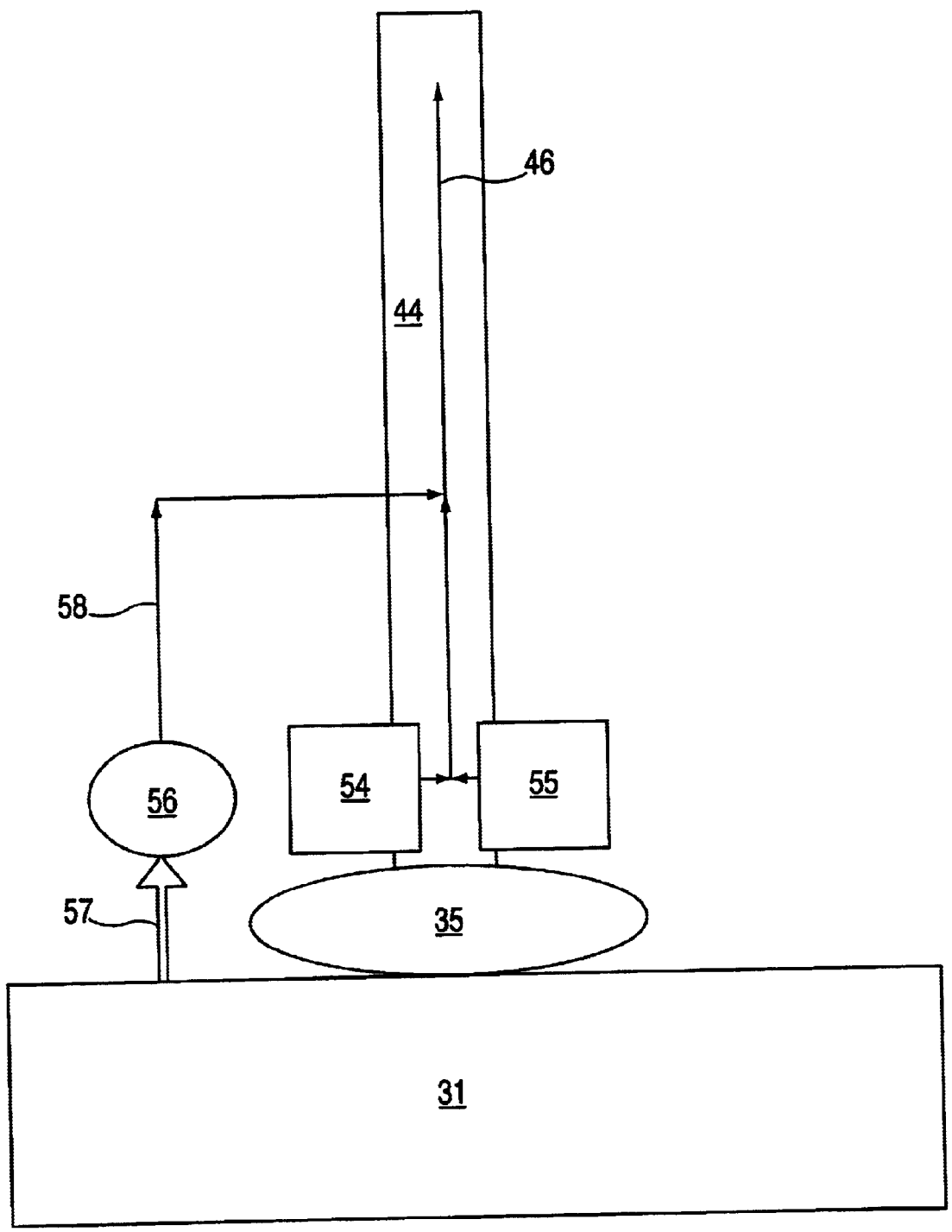
FIG. 3 illustrates diagrammatically a device according to the present invention using an accelerometer mounted near a wheel of a vehicle.

FIG. 3 illustrates diagrammatically a device according to the present invention. Tire 31 is mounted on an end of Axle 44 via Suspension Unit 35 in a similar fashion to the illustration of FIG. 2. Instead of Sensor Unit 40 however, FIG. 3 illustrates Wheel Rotation Speed Sensor 54 and Accelerometer 55 attached to Axle 44. Accelerometer 55 may be a one-dimensional, two-dimensional, or three-dimensional accelerometer, and may measure acceleration in the vertical, longitudinal, and/or lateral directions. Alternatively, as in the embodiment described with respect to FIG. 2, Wheel Rotation Speed Sensor 54 and Accelerometer 55 may be combined in one unit. As illustrated in FIG. 3, Wheel Rotation Speed Sensor 54 and Accelerometer 55 are each electrically connected to Wire 46, which runs along Axle 44 to a point (not shown) where Wire 46 joins with the wire (not shown) running from the other end of Axle 44 and the sensor units (not shown) arranged there. The signals from Wheel Rotation Speed Sensor 54 and Accelerometer 55 may be modulated to enable the signals to be carried on one wire without interference. Additionally, Infrared Sensor 56 may be positioned in the vicinity of Tire 31 with a sensing component (not shown) directed at Tire 31. The sensing component of Infrared Sensor 56 may be able to sense infrared radiation emitted from Tire 31 in the direction of Arrow 57. Infrared Sensor 56 may also have Infrared Signal Wire 58 which couples to Wire 46. Therefore, the signal from Infrared Sensor 56 may also be modulated along with the signals from Wheel Rotation Speed Sensor 54 and Accelerometer 55 in order to enable all three signals to be communicated to the ECU (not shown) without interference. The additional data relating to temperature of the tire obtained from such an IR sensor may be used to compensate for temperature effects and to thereby improve the accuracy of the information obtained from the system.

A method, device, and system utilizing an accelerometer and a wheel rotation speed sensor arranged near a wheel of a vehicle for determining a vehicle operating condition are provided herein. While several embodiments have been discussed, others, within the invention's spirit and scope, are also plausible.

What is claimed is:

1. A method for monitoring an operating condition of a vehicle, the method comprising:
   determining at a first wheel a first acceleration;
   determining a first wheel rotation speed; and
   determining the operating condition as a function of at least the first wheel rotation speed and the first acceleration;
   wherein the operating condition includes at least one of a first tire condition, a first wheel condition, and a first suspension condition; and
   wherein determining the operating condition includes determining at least one of a first tire resonant frequency, a first wheel resonant frequency, and a first suspension resonant frequency.

2. The method according to claim 1, further comprising:
   determining at a second wheel at least one of a second longitudinal acceleration, a second lateral acceleration, and a second vertical acceleration;
   determining a second wheel rotation speed; and
   determining the operating condition as a function of at least the second wheel rotation speed and the at least one of the second longitudinal acceleration, the second lateral acceleration, and the second vertical acceleration;
   wherein the operating condition includes at least one of a second tire condition, a second wheel condition, and a second suspension condition.

3. The method according to claim 2, further comprising:
   determining at a third wheel at least one of a third longitudinal acceleration, a third lateral acceleration, and a third vertical acceleration;
   determining a third wheel rotation speed; and
   determining the operating condition as a function of at least the third wheel rotation speed and the at least one of the third longitudinal acceleration, the third lateral acceleration, and the third vertical acceleration;
   wherein the operating condition includes at least one of a third tire condition, a third wheel condition, and a third suspension condition.

4. The method according to claim 3, further comprising:
   determining at a fourth wheel at least one of a fourth longitudinal acceleration, a fourth lateral acceleration, and a fourth vertical acceleration;
   determining a fourth wheel rotation speed; and
   determining the operating condition as a function of at least the fourth wheel rotation speed and the at least one of the fourth longitudinal acceleration, the fourth lateral acceleration, and the fourth vertical acceleration,
   wherein the operating condition includes at least one of a fourth tire condition, a fourth wheel condition, and a fourth suspension condition.

5. The method according to claim 1, wherein the first tire condition includes at least one of a first tire pressure and a first tire tread wear.

6. The method according to claim 1, wherein the first wheel condition includes at least one of a first wheel imbalance and a first wheel rim condition.

7. The method according to claim 1, wherein determining the operating condition includes at least one of:
   comparing the first tire resonant frequency to a nominal tire resonant frequency;
   comparing the first wheel resonant frequency to a nominal wheel resonant frequency; and
   comparing the first suspension resonant frequency to a nominal suspension resonant frequency.

8. The method according to claim 7, further comprising issuing a warning if at least one of:
   a first tire variation between the first tire resonant frequency and the nominal tire resonant frequency is greater than a predetermined tire variation;
   a first wheel variation between the first wheel resonant frequency and the nominal wheel resonant frequency is greater than a predetermined wheel variation; and
   a first suspension variation between the first suspension resonant frequency and the nominal suspension resonant frequency is greater than a predetermined suspension variation.

9. The method according to claim 8, wherein issuing a warning includes at least one of illuminating a warning light and sounding a warning sounder.

10. The method according to claim 1, wherein the first acceleration includes at least one of a first longitudinal acceleration, a first lateral acceleration, and a first vertical acceleration.

11. The method according to claim 10, wherein determining the operating condition includes at least one of:
    comparing the first longitudinal acceleration to a modeled longitudinal acceleration, wherein the modeled longitudinal acceleration is determined at least by time and the first wheel rotation speed;
    comparing the first lateral acceleration to a modeled lateral acceleration, wherein the modeled lateral acceleration is determined at least by time and the first wheel rotation speed; and
    comparing the first vertical acceleration to a modeled vertical acceleration, wherein the modeled vertical acceleration is determined at least by time and the first wheel rotation speed.

12. The method according to claim 11, further comprising issuing a warning if at least one of:
    a first longitudinal variation between the first longitudinal acceleration and the modeled longitudinal acceleration is greater than a predetermined longitudinal variation;
    a first lateral variation between the first lateral acceleration and the modeled lateral acceleration is greater than a predetermined lateral variation; and
    a first vertical variation between the first vertical acceleration and the modeled vertical acceleration is greater than a predetermined vertical variation.

13. The method according to claim 12, wherein issuing a warning includes at least one of illuminating a warning light and sounding a warning sounder.

14. A method for monitoring an operating condition of a vehicle, the method comprising:
    determining at a first wheel a first acceleration;
    determining a first wheel rotation speed;
    determining the operating condition as a function of at least the first wheel rotation speed and the first acceleration; and at least one of:
  determining at the first wheel a first temperature by an infrared sensor;
  determining at the center of gravity an inertia; and
  determining at a suspension a vertical displacement;
wherein the operating condition includes at least one of a first tire condition, a first wheel condition, and a first suspension condition.

15. The method according to claim 1, wherein the operating condition includes the first tire condition.

16. The method according to claim 1, wherein the operating condition includes the first wheel condition.

17. The method according to claim 1, wherein the operating condition includes the first suspension condition.

18. A device comprising:
  an accelerometer at a wheel of a vehicle for determining an acceleration;
  a wheel rotation speed sensor for determining a rotation speed of the wheel;
  a microprocessor for determining an operating condition as a function of the rotation speed and the acceleration, the microprocessor electrically coupled to the accelerometer and the wheel rotation speed sensor, wherein the operating condition includes at least one of a tire condition, a wheel condition, and a suspension condition; and
  at least one of:
    an infrared sensor for determining a temperature at the wheel electrically coupled to the microprocessor;
    an inertial sensor at the center of gravity electrically coupled to the microprocessor; and
    a vertical displacement sensor at a suspension system for the wheel electrically coupled to the microprocessor.

19. The device according to claim 18, wherein the tire condition includes at least one of a tire pressure and a tire tread wear.

20. The device according to claim 18, wherein the wheel condition includes at least one of a wheel imbalance and a wheel rim condition.

21. A device, comprising:
  an accelerometer at a wheel of a vehicle for determining an acceleration;
  a wheel rotation speed sensor for determining a rotation speed of the wheel;
  a microprocessor for determining an operating condition as a function of the rotation speed and the acceleration, the microprocessor electrically coupled to the accelerometer and the wheel rotation speed sensor, wherein the operating condition includes at least one of a tire condition, a wheel condition, and a suspension condition; and
  a storage device electrically coupled to the microprocessor, the storage device for storing at least one of at least one nominal-value resonant frequency and a time-domain model.

22. The device according to claim 21, wherein:
  the storage device stores the at least one nominal-value resonant frequency; and
  the microprocessor determines at least one of a tire resonant frequency, a wheel resonant frequency, and a suspension resonant frequency.

23. The device according to claim 22, wherein the microprocessor at least one of:
  compares the tire resonant frequency to a tire nominal-value resonant frequency;
  compares the wheel resonant frequency to a wheel nominal-value resonant frequency; and
  compares the suspension resonant frequency to a suspension nominal-value resonant frequency.

24. The device according to claim 23, further comprising at least one of a warning light and a warning sounder, the at least one of the warning light and the warning sounder issuing a warning if at least one of:
  a tire variation between the tire resonant frequency and the nominal-value tire resonant frequency is greater than a predetermined tire variation;
  a wheel variation between the wheel resonant frequency and the nominal-value wheel resonant frequency is greater than a predetermined wheel variation; and
  a suspension variation between the suspension resonant frequency and the nominal-value suspension resonant frequency is greater than a predetermined suspension variation.

25. The device according to claim 21, wherein the accelerometer determines at least one of a longitudinal acceleration, a lateral acceleration, and a vertical acceleration.

26. The device according to claim 25, wherein the storage device stores the time-domain model, and the microprocessor at least one of:
  compares the longitudinal acceleration to a modeled longitudinal acceleration, wherein the modeled longitudinal acceleration is determined at least by time and a wheel rotation speed;
  compares the lateral acceleration to a modeled lateral acceleration, wherein the modeled lateral acceleration is determined at least by time and the wheel rotation speed; and
  compares the vertical acceleration to a modeled vertical acceleration, wherein the modeled vertical acceleration is determined at least by time and the wheel rotation speed.

27. The device according to claim 26, further comprising at least one of a warning light and a warning sounder, the at least one of the warning light and the warning sounder issuing a warning if at least one of:
  a longitudinal variation between the longitudinal acceleration and the modeled longitudinal acceleration is greater than a predetermined longitudinal variation;
  a lateral variation between the lateral acceleration and the modeled lateral acceleration is greater than a predetermined lateral variation; and
  a vertical variation between the vertical acceleration and the modeled vertical acceleration is greater than a predetermined vertical variation.

28. The device according to claim 18, wherein the accelerometer and the wheel rotation speed sensor are integrated in one unit.

29. The device according to claim 18, wherein the operating condition includes the tire condition.

30. The device according to claim 18, wherein the operating condition includes the wheel condition.

31. The device according to claim 18, wherein the operating condition includes the suspension condition.

32. A system for monitoring an operating condition of a vehicle, the vehicle having at least one wheel arranged on a corresponding axle, comprising:
  an accelerometer for each wheel of the vehicle, each of the accelerometers situated at an end of the corresponding axle, each of the accelerometers determining an acceleration;

a wheel rotation speed sensor for each respective wheel of the vehicle, each of the wheel rotation speed sensors situated at the end of the corresponding axle, each of the wheel rotation speed sensors determining a rotation speed for the respective wheel; and a microprocessor for determining the operating condition electrically coupled to each of the accelerometers and each of the wheel rotation speed sensors, wherein the operating condition includes at least one of a tire condition, a wheel condition, and a suspension condition;

wherein the accelerometers determine at least one of a longitudinal acceleration, a lateral acceleration, and a vertical acceleration.

33. The system according to claim, 32, wherein the accelerometer and the wheel rotation speed sensor are integrated in one unit.

34. The system according to claim 32, wherein:

the tire condition includes at least one of a tire pressure and a tire tread wear; and the wheel condition includes at least one of a wheel imbalance and a wheel rim condition.

35. A system for monitoring an operating condition of a vehicle, the vehicle having at least one wheel arranged on a corresponding axle, comprising:

an accelerometer for each wheel of the vehicle, each of the accelerometers situated at an end of the corresponding axle, each of the accelerometers determining an acceleration;

a wheel rotation speed sensor for each respective wheel of the vehicle, each of the wheel rotation speed sensors situated at the end of the corresponding axle, each of the wheel rotation speed sensors determining a rotation speed for the respective wheel;

a microprocessor for determining the operating condition electrically coupled to each of the accelerometers and each of the wheel rotation speed sensors, wherein the operating condition includes at least one of a tire condition, a wheel condition, and a suspension condition; and at least one of:
 an infrared sensor for determining a temperature at each wheel electrically coupled to the microprocessor;
 an inertial sensor at the center of gravity electrically coupled to the microprocessor; and
 a vertical displacement sensor at a suspension system for each wheel electrically coupled to the microprocessor.

36. The system according to claim 32, further comprising:

a storage device electrically coupled to the microprocessor, the storage device for storing at least one of at least one nominal-value resonant frequency and a time-domain model; and at least one of a warning light and a warning sounder electrically coupled to the microprocessor.

37. The system according to claim 36, wherein:

the storage device stores the at least one nominal-value resonant frequency; and the microprocessor determines for each wheel at least one of a tire resonant frequency, a wheel resonant frequency, and a suspension resonant frequency.

38. The system according to claim 37, wherein the microprocessor operates the at least one of the warning light and the warning sounder if at least one of:

a tire variation between the tire resonant frequency and the nominal-value tire resonant frequency is greater than a predetermined tire variation;

a wheel variation between the wheel resonant frequency and the nominal-value wheel resonant frequency is greater than a predetermined wheel variation; and a suspension variation between the suspension resonant frequency and the nominal-value suspension resonant frequency is greater than a predetermined suspension variation.

39. The system according to claim 36, wherein:

the storage device stores the time-domain model;

the microprocessor operates the at least one of the warning light and the warning sounder if the longitudinal acceleration varies from a modeled longitudinal acceleration by more than a predetermined longitudinal variation, wherein the modeled longitudinal acceleration is determined at least by time and a wheel rotation speed;

the microprocessor operates the at least one of the warning light and the warning sounder if the lateral acceleration varies from a modeled lateral acceleration by more than a predetermined lateral variation, wherein the modeled lateral acceleration is determined at least by time and the wheel rotation speed; and the microprocessor operates the at least one of the warning light and the warning sounder if the vertical acceleration varies from a modeled vertical acceleration by more than a predetermined vertical variation, wherein the modeled vertical acceleration is determined at least by time and the wheel rotation speed.

40. The system according to claim 32, wherein the operating condition includes the tire condition.

41. The system according to claim 32, wherein the operating condition includes the wheel condition.

42. The system according to claim 32, wherein the operating condition includes the suspension condition.

* * * * *